United States Patent [19]

Osman

[11] Patent Number: 4,763,194

[45] Date of Patent: Aug. 9, 1988

[54] SELECTABLE RASTER SIZE FOR VIDEO DISPLAY

[75] Inventor: Peter D. Osman, Indianapolis, Ind.

[73] Assignee: RCA Licensing Corporation, Princeton, N.J.

[21] Appl. No.: 107,127

[22] Filed: Oct. 9, 1987

Related U.S. Application Data

[63] Continuation of Ser. No. 765,734, Aug. 14, 1985, abandoned.

[51] Int. Cl.$^4$ ............................................. H04N 5/63
[52] U.S. Cl. ................................. 358/180; 358/77; 358/243
[58] Field of Search .............. 358/22, 77, 180, 74, 358/212, 242, 243, 287; 315/371

[56] References Cited

U.S. PATENT DOCUMENTS

| | | | |
|---|---|---|---|
| 3,235,767 | 2/1966 | Bähring | 315/27 |
| 3,908,083 | 9/1975 | Hiraki et al. | 178/7.5 |
| 4,028,726 | 7/1977 | Argy | 358/165 |
| 4,254,365 | 3/1981 | Knight | 315/371 |
| 4,385,324 | 5/1983 | Shioda et al. | 358/237 |
| 4,394,690 | 7/1983 | Kobayashi | 358/180 |
| 4,547,708 | 10/1985 | Haferl | 315/371 |

FOREIGN PATENT DOCUMENTS

| | | |
|---|---|---|
| 994817 | 6/1965 | United Kingdom . |
| 1047269 | 11/1966 | United Kingdom . |
| 2023976 | 1/1980 | United Kingdom . |
| 2094114 | 9/1982 | United Kingdom . |

*Primary Examiner*—Tommy P. Chin
*Attorney, Agent, or Firm*—Eugene M. Whitacre; Joseph J. Laks; Sammy S. Henig

[57] ABSTRACT

Size control circuitry allows the selection of a number of different combinations of raster heights and widths for a video display apparatus. A raster size selection signal is decoded to determine one of a number of possible height and width combinations. The height is determined by varying the vertical size feedback signal to the vertical deflection circuits. The raster width is determined by varying the operation of a side pincushion correcting diode modulator circuit.

11 Claims, 1 Drawing Sheet

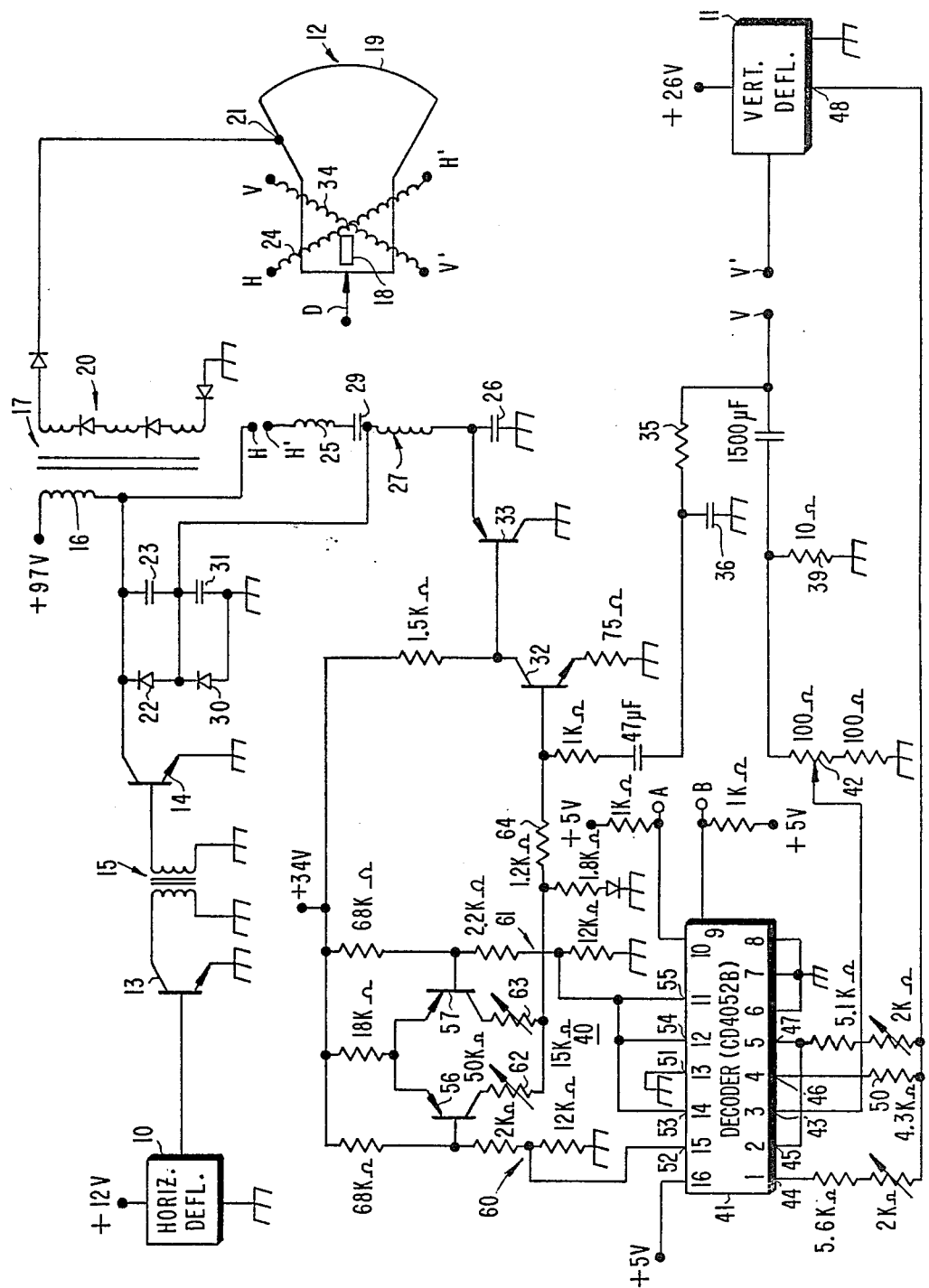

SELECTABLE RASTER SIZE FOR VIDEO DISPLAY

This is a continuation of application Ser. No. 765,734, filed Aug. 14, 1985 now abandoned.

This invention relates to video display apparatus and, in particular, to video display apparatus that provides different raster size capability.

A video display apparatus, such as a television receiver or a computer monitor, typically incorporates a cathode ray tube that produces one or more electron beams that are deflected or scanned across a phosphor display screen of the tube to form a raster. The raster defines the size and shape of the viewable area on the screen when a video signal is present.

When the video display apparatus is used as a computer monitor, it is desirable that the monitor be usable with different computer manufacturers or different computer systems of the same manufacturer. Different computers may generate different video signals having different amounts of video information per horizontal scan line, or different numbers of scan lines per field. For example, the ratio of active video information with respect to the blanking interval may be different for video signals having different resolution characteristics. If the horizontal and vertical deflection amplitudes are not selected in accordance with the characteristics of the video signal, overscan or underscan of the video signal on the raster may occur, resulting in inefficient use of the display screen in the case of underscan or in the loss of picture information in the case of overscan.

In accordance with an aspect of the present invention, a video display apparatus having circuitry for generating rasters having different horizontal and vertical deflection amplitudes comprises a circuit for receiving a signal indicative of one of a plurality of horizontal and vertical deflection amplitudes. Circuitry is responsive to the indicating signal for generating one of a number of first signals identifying one of a selectable horizonal deflection amplitude, and to the indicating signal for generating one of a number of second signals identifying one of a selective vertical deflection amplitude. Circuitry generates horizontal deflection current having a maximum amplitude determined in response to he first signal and vertical deflection current having a maximum amplitude determined in response to the second signal.

In accordance with another aspect of the present invention, a video display apparatus incorporates an arrangement for changing raster width comprising a circuit for receiving a signal indicating one of a number of raster widths. Circuitry produces and controls horizontal deflection current in order to correct horizontal deflection distortion. A circuit modifies the current controlling circuit in response to the raster width indicating signal to produce selectable changes in the raster width.

In accordance with another aspect of the present invention, a video display apparatus incorporates an arrangement for changing raster height comprising a circuit for receiving a signal indicating one of a number of selectable raster heights. Circuitry produces vertical deflection current. A circuit, including feedback circuitry, samples the vertical deflection current to control its magnitude. Circuitry is coupled to the sampling circuit and modifies the feedback circuit in response to the raster height indicating signal in order to produce selectable changes in the raster height.

In the accompanying drawing, the sole FIGURE is a block and schematic diagram of a portion of a video display apparatus in accordance with an aspect of the present invention.

Referring to the FIGURE, there is shown a portion of a video display apparatus including horizontal deflection circuitry 10, vertical deflection circuitry 11 and a cathode ray tube 12. Cathode ray tube 12 illustratively receives drive signals D from video processing circuitry (not shown) that are applied to an electron gun assembly 18. Electron gun assembly 18 produces one or more electron beams which are caused to strike and illuminate a phosphor display screen 19. Horizontal deflection circuitry 10, which may illustratively include an integrated circuit identified as TDA 2595, applies a switching signal to the base of a driver transistor 13. Switching of driver transistor 13 causes horizontal output transistor 14 to switch via driver transformer 15. The collector of horizontal output transistor 14 is coupled via the primary winding 16 of a power transformer 17 to a source of B+ supply voltage of the order of +97 V. Transformer 17 is illustratively shown as having a secondary winding 20 that produces a high voltage level that is applied to the high voltage or anode terminal 21 of the cathode ray tube 12. The horizontal deflection circuit also includes a damper diode 22 and a retrace capacitor 23 that operate in a conventional manner to produce retrace pulses across primary winding 16 when transistor 14 is switched off. Switching of horizontal output transistor 14 also causes horizontal deflection current to flow in horizontal deflection winding 24, located on the neck of cathode ray tube 12, via terminals H and H'. Horizontal deflection winding 24 makes up a part of the deflection yoke which deflects the electron beam from electron gun assembly 18 in order to form a raster on display screen 19.

The horizontal deflection circuit also includes a linearity coil 25, an S-shaping capacitor 29, and a diode modulator circuit that corrects E-W or side pincushion raster distortion. The diode modulator comprises a modulator inductor 27, damper diode 30, modulator retrace capacitor 31, modulator trace capacitor 26, the control transistors 32 and 33. The diode modulator operates in a conventional manner to modulate the horizontal deflection current in a parabolic manner at the vertical deflection rate to correct E—W pincushion distortion.

Vertical deflection circuitry 11, which may illustratively include an integrated circuit identified as TDA 2653A, generates a vertical deflection current in a vertical deflection winding 34, via terminals V and V'. Deflection winding 34 is also located on the neck of the tube 12 and forms part of the deflection yoke along with horizontal deflection winding 24. The vertical deflection current sawtooth signal is applied to integrating circuitry comprising resistor 35 and capacitor 36 to form the vertical rate parabolic signal that is applied to the base of transistor 32 of the diode modulator circuit previously described.

In accordance with an aspect of the present invention, the video display apparatus of the FIGURE includes raster size selection circuitry 40 comprising a decoder 41. Decoder 41 is illustratively shown as a demultiplexing circuit, identified as CD 4952B, manufactured by RCA Corporation. Decoder 41 receives a digital signal via input terminals A and B Each of terminals A and B illustratively receives a one bit signal, each one bit signal having two possible states. The combination of the signals received at terminals A and B defines one of a possible four combinations of horizontal and vertical raster sizes based on the four possible digital input values. The desired horizontal and vertical sizes are determined in the following manner.

A sample signal developed across a resistor 39 and derived from the vertical deflection current is applied via a manual height adjustment resistor 42 to terminal 43 of decoder 41. Decoder 41 essentially operates as a switch, and selectively couples the signal applied at terminal 43 via a low resistance path of the order of 400 ohms to one of terminals 44, 45, 46 or 47, in response to the signals received at terminals A and B. For example, in accordance with the decoding or demultiplexing logic of decoder 41, a high level signal, corresponding to a digital "1" present at both terminals A and B will cause decoder 41 to couple the signal at terminal 43 to terminal 46. Terminal 46 is coupled via a resistor 50 to a feedback input terminal 48 of vertical deflection circuitry 11, illustratively pin 4 of TDA 2653A. Terminals 44, 45 and 47 are also coupled via resistors having different resistance values to the feedback input of circuit 11. Since the value of the resistance in the feedback path between the wiper arm of manual height control 42 and the feedback terminal 48 will determine the raster height, decoder 41 will therefore act to control the vertical raster size in response to the selected size signal applied via terminals A and B. Since the decoder 41, which determines the selected raster height, is included within the linearity and height feedback loop, any variations in deflection current, caused by supply voltage variations, for example, will be compensated by the feedback circuitry of vertical deflection circuit 11. The raster height will therefore remain stable at whatever height is selected.

In accordance with another feature of the invention, in order to provide raster width control, decoder 41 couples, via a low resistance path, terminal 51 to one of terminals 52, 53, 54 or 55, depending on the signal levels applied to terminals A and B. In accordance with its operating logic, decoder 41 will silmultaneously select one of terminals 44, 45, 46 or 47 and one of terminals 52, 53, 54 or 55 to be coupled to terminals 43 and 51, respectively, so that there will be a maximum of four combinations of two-terminal selections. The selection of one of terminals 52, 53, 54 or 55 will therefore be used to determine the horizontal raster width. As can be seen, terminals 53, 54 and 55 are coupled together, as are terminals 45 and 47. In this manner the specific combinations of raster height to raster width are controlled. Raster width is determined as follows. Transistor 56 has its base coupled via a voltage divider 60 to terminal 52. The base of transistor 57 is coupled via a voltage divider 61 to terminals 53, 54 and 55. The emitters of transistors 56 and 57 are coupled, via resistors 62 and 63, respectively, and resistor 64 to the base of diode modulator transistor 32. Since terminal 51 is grounded, when either terminal 52, or terminals 53, 54 or 55 are coupled to terminal 51 in response to the signals at terminals A and B, the bases of their respective transistors 56 or 57 will be pulled low and the associated transistor will be turned on. Resistor 62 and 63 have different resistance values, so that the DC bias on transistor 32 will be different depending on which of transistors 56 or 57 is conducting, which in turn depends on the terminals selected via the raster size selection signal applied to terminals A and B. The DC bias on transistor 32 determines the rate of conduction of transistor 32 and transistor 33 in response to the parabolic waveform from vertical deflection circuitry 11, which essentially determines the amount of deflection current modulation and hence the raster width.

For the particular embodiment shown in the FIGURE, the following table illustrates which of terminals 44, 45, 46, or 47 are connected to terminal 43 and which of terminals 52, 53, 54 or 55 are connected to terminal 51 for each of the four possible logic combinations of the signals applied to terminals A and B.

| A | B | Terminal 43 connected to terminal - | Terminal 51 connected to terminal - |
|---|---|---|---|
| 0 | 0 | 44 | 54 |
| 0 | 1 | 45 | 52 |
| 1 | 0 | 47 | 53 |
| 1 | 1 | 46 | 55 |

The previously described raster size selection circuitry can therefore be utilized to select up to four combinations of different raster heights and widths. Stable raster patterns are maintained for any of the selected raster sizes.

What is claimed is:
1. A video display apparatus including means for generating rasters having different horizontal and vertical deflection amplitudes comprising:
   means for receiving a digitally encoded signal;
   means for decoding said digitally encoded signal for generating one of a plurality of first signals in response to information embodied in said digitally encoded signal, each of said one of said first signals identifying a predetermined horizontal deflection amplitude, and for generating one of a plurality of second signals in response to information embodied in said digitally encoded signal, each of said one of said second signals identifying a predetermined vertical deflection amplitude;
   means for generating horizontal deflection current having a maximum amplitude determined in response to said first signals; and
   means for generating vertical deflection current having a maximum amplitude determined in response to said second signals.
2. The arrangement defined in claim 1, wherein said means for generating horizontal deflection current comprises means for controlling said horizontal deflection amplitude in order to correct horizontal deflection distortion, said amplitude controlling means being responsive to said first signals for controlling said horizontal deflection amplitude in order to change the width of said rasters.
3. The arrangement defined in claim 1, wherein said means for generating vertical deflection current comprises means for controlling said vertical deflection amplitude, said amplitude controlling means being responsive to said second signals for controlling said vertical deflection amplitude in order to change the height of said rasters.
4. The arrangement defined in claim 3, wherein said means for generating vertical deflection current comprises feedback means for reducing undesirable variation in raster height.

5. The arrangement defined in claim 4, wherein said means for controlling said vertical deflection amplitude comprises means for selectively coupling impedance networks to said feedback means for changing said raster height.

6. In a video display apparatus, means for changing raster width comprising:
   means for receiving a digitally encoded signal;
   means for decoding said digitally encoded signal to generate a signal indicative of one of a plurality of predetermined raster widths;
   means for producing horizontal deflection current;
   means for controlling said horizontal deflection current in order to correct horizontal deflection distortion;
   means for modifying said current controlling means in response to said raster width indicative signal for producing said selected raster width.

7. The arrangement defined in claim 6, wherein said horizontal deflection current controlling means comprises a diode modulator circuit for correcting side pincushion distortion.

8. The arrangement defined in claim 7, wherein said means for modifying said horizontal deflection current controlling means comprises switchable current paths, one of said current paths selected in response to said raster width indicative signal.

9. The arrangement defined in claim 8, wherein the selection of one of said current paths controls the bias current to said diode modulator circuit.

10. In a video display apparatus, means for changing raster height comprising:
    means for receiving a digitally encoded signal;
    means for decoding said digitally encoded signal to generate a signal indicative of one of a plurality of predetermined raster heights;
    means for producing vertical deflection current;
    means, including feedback means for sampling said vertical deflection current in order to control the magnitude of said vertical deflection current; and
    means coupled to said sampling means for modifying said feedback means in response to said raster height indicative signal in order to produce selectable changes in said raster height.

11. The arrangement defined in claim 10, wherein said feedback modifying means changes the impedance of the vertical deflection current feedback path.

* * * * *